Patented July 5, 1938

2,122,883

UNITED STATES PATENT OFFICE 2,122,883

FIRE EXTINGUISHING AND PREVENTING FOAM, BASE THEREFOR, AND METHOD OF PRODUCING THE SAME

Orla E. Hood, Indianapolis, Ind.; Elmer P. Warren, administrator of said Orla E. Hood, deceased, assignor to Myrtle Hood No Drawing. Application February 18, 1935, Serial No. 7,076

14 Claims. (Cl. 23—11)

The object of my invention is to produce a mixture of materials capable of remaining liquid at temperatures well below zero Fahrenheit and from which a fire resistant and fire extinguishing foam may be readily produced in large volumes, said foam being of such character that it will be highly mobile; of such character that it will not damage articles upon which it is deposited; of such character that it may be readily water-washed from articles upon which it is applied; of such character that it will remain for long periods upon the surfaces of inflammable liquids such as oils, gasolines, naptha; and which may be produced from readily obtainable low-cost materials some of which are, at present, waste by-products for which heretofore there have been but few known uses.

I have discovered that a properly proportioned mixture of an aqueous solution of a chlorine salt (such for instance as a sodium chloride, calcium chloride, magnesium chloride, or calcium magnesium chloride) with the syrup-like waste from sulphite process wood pulp digesters (commonly known as sulphite cellulose liquor), and the waste from the process of producing glycerine, commonly known as glycerine foots, can be expanded to stable foam by admixture therewith of large volumes of air, and that the foam so formed is capable of smothering fire and is stable, for many days, upon the surfaces of all oils which are not miscible in water, inflammable liquids such as gasolines, naptha, etc., and is readily removable by water from surfaces upon which it may be applied.

Sodium chloride, in aqueous solution, freezes at about minus 7 degrees Fahrenheit; an aqueous solution of calcium chloride (at about 4.3 pounds per gallon) freezes at about minus 59 degrees Fahrenheit; a similar solution of magnesium chloride does not freeze at any atmospheric temperatures of which I have been able to learn; and a similar aqueous solution of calcium magnesium chloride is at least equally resistant to freezing. Other concentrations of solutions of the above chemicals will, of course, freeze at different temperatures, depending upon the degree of concentration and consequently an aqueous solution of one or the other of the above-mentioned salts may be readily adopted for the climatic conditions normally existing at the place at which my mixture is to be used.

Sodium chloride, calcium chloride, and magnesium chloride, are useful in many arts but calcium magnesium chloride, of which immense quantities are produced in the production of sodium chloride, is substantially a completely waste product and, because of the relatively great effect of this salt upon the freezing point of aqueous solutions thereof, it is probably the most commercially available chlorine salt for my purpose, although I wish it to be understood that my discovery, in its broadest aspect, is by no means limited to that particular salt.

I have not yet completed my investigations into the question of what other substances might be used in place of sodium, calcium, or magnesium chloride salts; but I am satisfied that many other substances could be used to produce, to a greater or less extent, the effects produced by those chlorides. Among such other substances are potassium carbonate, potassium chloride, barium bromide, potassium iodide, sodium bromide, magnesium bromide, magnesium chloride, anhydrous strontium bromide, potassium cyanide, lithium chloride, calcium nitrate, zinc chloride and sodium or potassium acetate. Still other substances which would produce some of the desired effects to the desired extent, and which might therefore be usable are zinc chlorate, zinc nitrate, ferrous nitrate, cobaltous chlorate, nickel chlorate, aluminum nitrate, sodium sulphide.

I am not able to state the exact chemical composition of the so-called sulphite cellulose liquor, known commercially as glutrin, or when dehydrated, as goulac. This material, which is commonly known by any one of the above-mentioned names, is waste effluent from the digestion of wood by the sulphite process in the preparation of wood pulp for paper making. When it issues from the digester it is a syrup-like material, more or less viscous, depending upon its water content, and may be reduced, by dehydration, to a solid which may be returned to syrup-form by the addition of water.

Glycerine foots is the tailings remaining after the extraction of medicinal and C. P. glycerine and lye glycerine from the largely unsaponified residuum in the production of soap. This material, glycerine foots, contains more or less lye glycerine, some manufacturers leaving the entire lye glycerine content; whereas others extract a portion of the lye glycerine content from the foots.

Sulphite cellulose liquor is acid in its reaction and is soluble in water. Glycerine foots is alkaline in its reaction and is soluble in water. These two materials are slowly miscible at atmospheric temperatures, the rate of miscibility being apparently dependent upon initial water dilution.

Gentle mechanical stirring will increase the rate of miscibility. Substantial heating of the sulphite cellulose liquor should be avoided.

Sulphite cellulose liquor is readily soluble in aqueous solutions of glycerine foots. Glycerine foots is readily soluble in aqueous dilutions of sulphite cellulose liquor. The chloride salts heretofore mentioned, in the salt form, are readily soluble in an aqueous solution of glycerine foots, in an aqueous dilution of sulphite cellulose liquor, or in an aqueous mixture of sulphite cellulose liquor and glycerine foots; and I am of the opinion that the corresponding salts of the other halogens are likewise soluble.

While foam, probably having some of the desirable characteristics hereinabove specified, may be made from an aqueous solution of one of the above-mentioned salts and glycerine foots, or from an aqueous solution of one of the above-mentioned salts and sulphite cellulose liquor, I now believe that the best results are produced by a mixture such as has been heretofore described as a preferable mixture.

A typical mixture may be produced as follows:

Mix together substantially equal parts of glycerine foots and sulphite cellulose liquor in aqueous solutions having about equal specific gravities. This mixture, which for convenience I shall call my H mixture, is readily miscible with a suitable aqueous solution of any one of the salts abovementioned.

Of calcium magnesium chloride (in its impure form which I understand is a waste material), take 200 pounds (preferably ground to a fairly fine form to facilitate ready solubility in water). To this add enough water to make 47 gallons of solution. To this mixture add the above-described H mixture of sulphite cellulose liquor and glycerine foots in an amount varying from 1 to 5 gallons, depending upon the character and stability of foam desired. There may be a considerable variation in the relative amounts of the aforesaid H mixture of sulphite cellulose liquor and glycerine foots, of the water content, and of the chloride content. For instance, decrease of chloride content will raise the freezing point of the mixture; decrease of the content of the H mixture will increase the motility of the foam and decrease its stability.

If into the above ultimate mixture air be blown, or if air be mixed therewith as liquid emerges from a nozzle, there will result a foam which is fire resistant and fire extinguishing.

If this ultimate mixture be contained in a container of somewhat greater volume than the mixture and provided with an air spray in its bottom and an outlet at its top, air blown through the spray nozzle into the liquid will produce a foam which will be ejected from the discharge nozzle of the container by the accumulated air pressure within the container. If, on the other hand, the above mixture be placed in an atomizing or nebulizing container and air be driven across the discharge nozzle so as to suck out the liquid, the air in nebulizing the liquid will also produce foam.

The character of apparatus for producing the foam may, of course, be varied through a wide range, the only essential being that large volumes of air be admixed with the liquid under such conditions as to permit the liquid to form air enveloping films.

For instance, the liquid described above may be used in conjunction with spray nozzles and an air supply pipe and an automatic heat-responsive air control valve as a substitute for automatic sprinkler systems. In such constructions the container for my liquid will be provided with a spraying discharge nozzle and the supply pipe of the air mixture will have therein a heat-responsive control valve with air under pressure behind the valve. Upon release of the valve in response to rise in temperature at the control point, air will flow into the liquid so as to discharge the fire extinguishing foam.

It will be readily understood that if for any reason the possible corrosive effects of the ultimate mixture which I have described above are considered objectionable, there may be added to said mixture other materials, such for instance as potassium chromate and sodium chromate, or the two together, without eliminating the foam producing capacity of such mixture and that, if permanency of non-corrosiveness of the mixture is desired, a small quantity of C. P. glycerine may be added, with the chromate, without destroying the foam producing capacity of the mixture.

The ultimate foam forming mixture which I have described above may be readily produced by diluting the sulphite cellulose liquor and the glycerine foots with quantities of water sufficient to provide the solvent for the salt.

The fire resistant and smothering quality of the foam appears to reach its maximum in a mixture in which the salt content is that which provides minimum freezing point for that particular salt, rather than a saturated solution.

I have found that in mixtures where the sulphite cellulose liquor is omitted I can produce a foam of desirable characteristics except that there is some decrease in motility and a substantial decrease in producible volume of foam per gallon of mixture.

According to my present information calcium magnesium chloride appears to be the preferable salt. First, because of its cheapness and second because of the relatively large weight soluble in water to produce minimum freezing temperature. Apparently the foaming volume capacity of my mixtures reach their maximum when the degree of salt concentration approximates that degree of salt concentration at which minimum freezing point is attained, although apparently the maximum foaming value is reached when the degree of saturation is slightly less than the saturation permissible for minimum freezing temperatures.

In describing a typical mixture I have indicated equal parts of glycerine foots and sulphite cellulose liquor in the mixture, irrespective of the degree of water dilution, as a stable mixture. According to my present information this appears to be the preferable proportion, but nevertheless I have found that these proportions may be varied to a considerable degree.

For instance, the sulphite cellulose liquor content may be as much as double the glycerine foots content but when this proportion is exceeded there seems to be a resultant diminution of foam volume and a tendency to stratify when quiescent. Increase in the glycerine foots content may be quite considerable resulting however in an increase of toughness of the foam and consequent decrease of motility.

The above described H mixture, i. e., fairly concentrated aqueous mixture of sulphite cellulose liquor and glycerine foots, is a stable mixture of reasonably low freezing point. It may be readily shipped to points of desired use and there mixed with the aqueous solution of the desired salt and this mixing may be accomplished without causing production of foam.

I claim as my invention:

1. A fire-smothering foam-producing normally stable liquid comprising in solution a chlorine salt, water, sulphite cellulose liquor, and glycerine foots containing lye glycerine, which liquid remains stable well below 32° F. and upon mechanical admixture with a gas will produce a fire-smothering foam.

2. A fire-smothering foam-producing normally stable liquid comprising in solution a chlorine salt, water, and glycerine foots containing lye glycerine, which liquid remains stable well below 32° F. and upon mechanical admixture with a gas will produce a fire-smothering foam.

3. A fire-smothering foam-producing normally stable liquid comprising in solution water, a chlorine salt, sulphite cellulose liquor and glycerine foots containing lye glycerine, wherein the sulphite cellulose liquor and glycerine foots ingredients comprise from 3% to 9% by volume of the mixture, which liquid remains stable well below 32° F. and upon mechanical admixture with a gas will produce a fire-smothering foam.

4. The method of producing a fire-smothering foam-producing liquid which consists in forming an aqueous solution of sulphite cellulose liquor and glycerine foots containing lye glycerine and mixing said solution with an aqueous solution of a chlorine salt, thereby producing a stable liquid mixture of the specified ingredients normally stable in liquid form at temperatures well below 32° F. and capable upon mechanical admixture with a gas of forming a fire-smothering foam.

5. A fire-smothering foam-producing liquid comprising an incombustible solvent holding in solution a substantially incombustible soluble salt which is inherently a solid at temperatures below 500° F. and which, when dissolved in the solvent, lowers the freezing point of the solution, said solvent holding also in solution a small amount of glycerine foots and sulphite cellulose liquor.

6. A fire-smothering foam-producing liquid comprising, in normally stable aqueous solution, a small percentage of glycerine foots and sulphite cellulose liquor, and a normally solid substantially incombustible water-soluble salt melting at a temperature above 500° F. and which, when in aqueous solution, materially lowers the freezing point of the solution.

7. A fire-smothering foam-producing liquid comprising, in normally stable aqueous solution, a small percentage of glycerine foots and sulphite cellulose liquor, and a normally solid substantially incombustible water-soluble material melting at a temperature above 500° F. and which, when in aqueous solution, lowers the freezing point of the solution to a temperature below 0° F.

8. A fire-smothering foam-producing liquid consisting of a multiplicity of adherent bubbles wherein the bubble film is composed of a solution comprising water, chlorine salt, sulphite cellulose liquor and glycerine foots.

9. As an article of manufacture, a stable solution of water, a chlorine salt, glycerine foots and sulphite cellulose liquor.

10. A fire-smothering foam-producing liquid comprising a normally stable aqueous solution of glycerine foots and sulphite cellulose liquor.

11. A normally stable liquid capable, upon admixture with a gas, of forming a stable, fire-smothering foam, such liquid comprising a substantially neutral aqueous solution of sulphite cellulose liquor and glycerine foots.

12. The method of producing a foam-forming normally stable liquid which comprises the production of a substantially neutral solution of sulphite cellulose liquor and glycerine foots, the production of an aqueous solution of a chloride salt, the substantial equalization of specific gravities of said two solutions, and the admixture of said two solutions.

13. A normally stable aqueous solution of glycerine foots and sulphite cellulose liquor comprising an aggregate of approximately eight parts of glycerine foots and sulphite cellulose liquor, whereof each ingredient comprises approximately not less than three parts and not more than five parts.

14. A normally stable aqueous solution of glycerine foots and sulphite cellulose liquor comprising an aggregate of approximately eight parts of glycerine foots and sulphite cellulose liquor, whereof each ingredient comprises approximately not less than three parts and not more than five parts, and wherein the lye glycerine content of the glycerine foots is from 3 to 35% thereof.

ORLA E. HOOD.